No. 767,118. PATENTED AUG. 9, 1904.
R. M. POPHAM & J. C. COOKE.
VALVE.
APPLICATION FILED MAY 15, 1903.
NO MODEL.
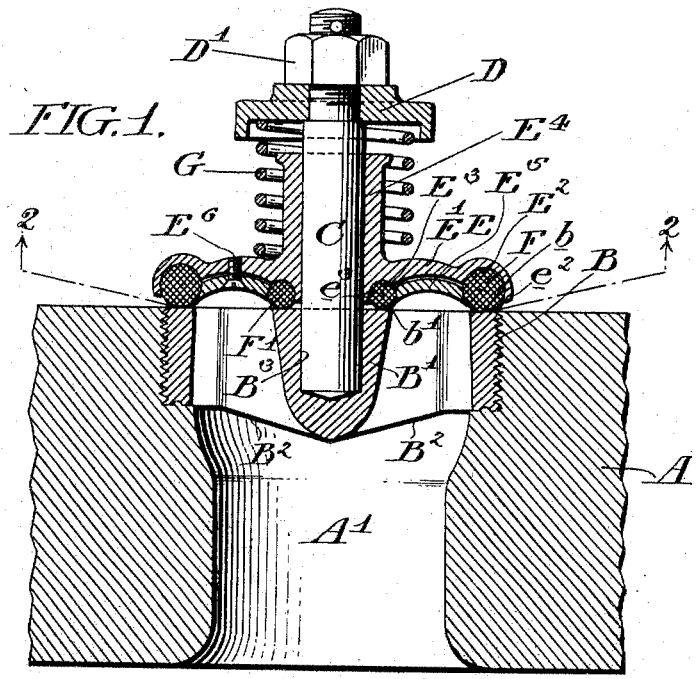
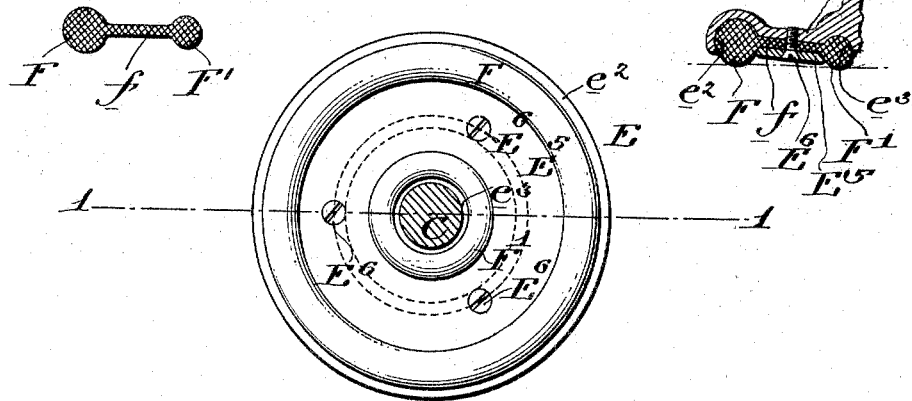
WITNESSES:
INVENTORS.
Richard M. Popham
John C. Cooke
BY Francis I. Chambers
ATTORNEY.

No. 767,118. Patented August 9, 1904.

UNITED STATES PATENT OFFICE.

RICHARD M. POPHAM AND JOHN C. COOKE, OF PHILADELPHIA, PENNSYLVANIA, ASSIGNORS TO SAID POPHAM.

VALVE.

SPECIFICATION forming part of Letters Patent No. 767,118, dated August 9, 1904.

Application filed May 15, 1903. Serial No. 157,217. (No model.)

*To all whom it may concern:*

Be it known that we, RICHARD M. POPHAM and JOHN C. COOKE, citizens of the United States of America, and residents of Philadelphia, in the county of Philadelphia, in the State of Pennsylvania, have invented a certain new and useful Improvement in Valves, of which the following is a true and exact description, reference being had to the accompanying drawings, which form a part thereof.

Our invention relates to the construction of valves of the character generally known as "puppet-valves," our object being to provide a valve of simple and strong construction having elastic contact portions of rubber or other suitable material, which are so disposed and arranged as not to become distorted in use.

The nature of our improvements will be best understood as described in connection with the drawings, in which they are illustrated, in which—

Figure 1 is a cross-sectional view of our valve and its seat, taken as on the line 1 1 of Fig. 2. Fig. 2 is a view of the seat side of the valve, the view being taken as on the line 2 2 of Fig. 1. Fig. 3 is a section through a modified form of gasket-ring, and Fig. 4 a section showing the modified ring in use.

A indicates the head in which the port (indicated at A') is formed.

B B' indicate the seat provided for the valve, consisting of an annular bushing B, screwing into a threaded portion of the port, and a concentric portion B', connected with the outer bushing by webs, as $B^2$, and, as shown, provided with a central perforation $B^3$ to receive a guide-stud. The seats proper of the valve are formed on the upper portions of the annular rings B and B' and are indicated at $b$ and $b'$.

C is a guide-stud secured in the perforation $B^3$ and having a spring-abutment D, adjustably secured on its upper end by means of a nut D'.

E indicates the valve, which, as shown, is made up of a plate E', provided with concentric annular gasket-ring seats, (indicated at $E^2$ and $E^3$,) the outer rim $e^2$ of the seat $E^2$ being prolonged, so as to make an actual engagement with the gasket, and the inner rim $e^3$ of the seat $E^3$ being similarly prolonged. As shown, the plate E' is also provided with a hollow bearing-spindle $E^4$, extending from its outer face and sliding on the guide-stud C.

$E^5$ is a clamping-plate which is removably secured to the plate E', as by screws $E^6$.

F and F' represent gasket-rings of rubber or other suitable material adapted to fit in the seats $E^2$ and $E^3$ and to be clamped therein by the plate $E^5$, as shown.

G indicates a spring the action of which is to hold the valve to its seat.

In operation the rings F and F' rest upon the seats $b$ and $b'$, no part of the metallic portion of the valve resting on the seats and by preference no part of the elastic portion of the valve resting upon any other than the plain annular seats $b$ and $b'$—that is to say, the elastic rings do not come in contact with the webs $B^2$. The valve constructed and arranged as shown is lifted from its seat by the inflow of fluid through the port A' and returned to its seat by the action of the spring G.

Instead of making the gasket-rings separate, as shown in Figs. 1 and 2, they may be joined by a web $f$, as shown in Figs. 3 and 4, the plate $E^5$ clamping the web, as shown in Fig. 4.

It is a material advantage of our construction that the rings F and F' are reversible, so that when they become worn on one side they can be reversed in the holder, and thus made to serve for double the time of the ordinary gasket as heretofore used.

It will be seen that our valve is of simple and strong construction and that the elastic portions thereof are not exposed to any deforming strains or pressure such as is commonly experienced in the use of valves having elastic faces.

Having now described our invention, what we claim as new, and desire to secure by Letters Patent, is—

1. A valve having in combination a valve-plate E', provided with countersunk recesses $E^2$, $E^3$, adapted to receive gasket-rings; gasket-rings F, F', fitting in said countersunk recesses and shaped as described to form outwardly-projecting seats extending outward from the face of the valve-plate directly in front of the gasket portions seated in the countersunk recesses and a clamping-plate situated between and holding the gasket-rings in the countersunk recesses of the valve-plate.

2. A valve having in combination a valve-plate E', provided with countersunk recesses $E^2$, $E^3$, adapted to receive gasket-rings, gasket-rings F, F', fitting in said countersunk recesses and shaped as described to form outwardly-projecting seats extending outward from the face of the valve-plate directly in front of the gasket portions seated in the countersunk recesses, said gasket-rings having a symmetrical sectional outline so as to be reversible, and a clamping-plate situated between and holding the gasket-rings in the countersunk recesses of the valve-plate.

3. A valve-port having concentric annular seats $b$, $b'$, in combination with a valve consisting of a valve-plate E', formed with countersunk annular gasket-seat recesses $E^2$, $E^3$, corresponding in position with the seats $b$, $b'$, annular gasket-rings F, F', seated in the countersunk recesses and extending outward from the face of the valve-plate to form annular seats directly in front to the gasket portions seated in the countersunk recesses of the valve-plate and in such position as to rest on without overlapping the edges of seats $b$, $b'$.

RICHARD M. POPHAM.
JOHN C. COOKE.

Witnesses:
CHAS. F. MYERS,
D. STEWART.